United States Patent
Coppersmith et al.

(10) Patent No.: US 6,256,736 B1
(45) Date of Patent: Jul. 3, 2001

(54) SECURED SIGNAL MODIFICATION AND VERIFICATION WITH PRIVACY CONTROL

(75) Inventors: Don Coppersmith, Ossining; Frederick Cole Mintzer, Shrub Oak; Charles P. Tresser, Mamaroneck; Chai Wah Wu, Ossining, all of NY (US); Minerva Ming-Yee Yeung, Sunnyvale, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/059,498

(22) Filed: Apr. 13, 1998

(51) Int. Cl.[7] ..................................................... H04L 9/32
(52) U.S. Cl. .............................................. 713/176; 705/58
(58) Field of Search ................................... 380/200, 201, 380/206; 713/176, 181; 705/58

(56) References Cited

U.S. PATENT DOCUMENTS 5,646,997 * 7/1997 Barton ................................... 380/201
5,721,788 * 2/1998 Powell et al. ......................... 380/200
6,061,793 * 5/2000 Tewfik et al. ......................... 380/206

FOREIGN PATENT DOCUMENTS

11212462 * 8/1999 (JP) ................................. G09C/5/00

OTHER PUBLICATIONS

Schneier, Bruce. "Applied Cryptography." Second Edition. John Wiley and Sons, Inc. 1996 (CIP 1995). pp. 75–76 and 85–86.*
Stallings, William. "Data and Computer Communications." Fifth Edition. Prentice Hall. 1997 (CIP 1996). pp. 656–664.*

* cited by examiner

*Primary Examiner*—Gilberto Barrón, Jr.
*Assistant Examiner*—Anthony DiLorenzo
(74) *Attorney, Agent, or Firm*—McGuireWoods, LLP; Stephen C. Kaufman

(57) ABSTRACT

A watermarking scheme which allows the watermarked image to be authenticated by an authentication agent without revealing the human-readable content of the image. There is disclosed an approach which combines privacy control with watermarking and authentication mechanisms. The watermark can be made to be imperceptible to humans. Public key cryptography allows the authentication agent to authenticate without being able to watermark an image.

12 Claims, 13 Drawing Sheets

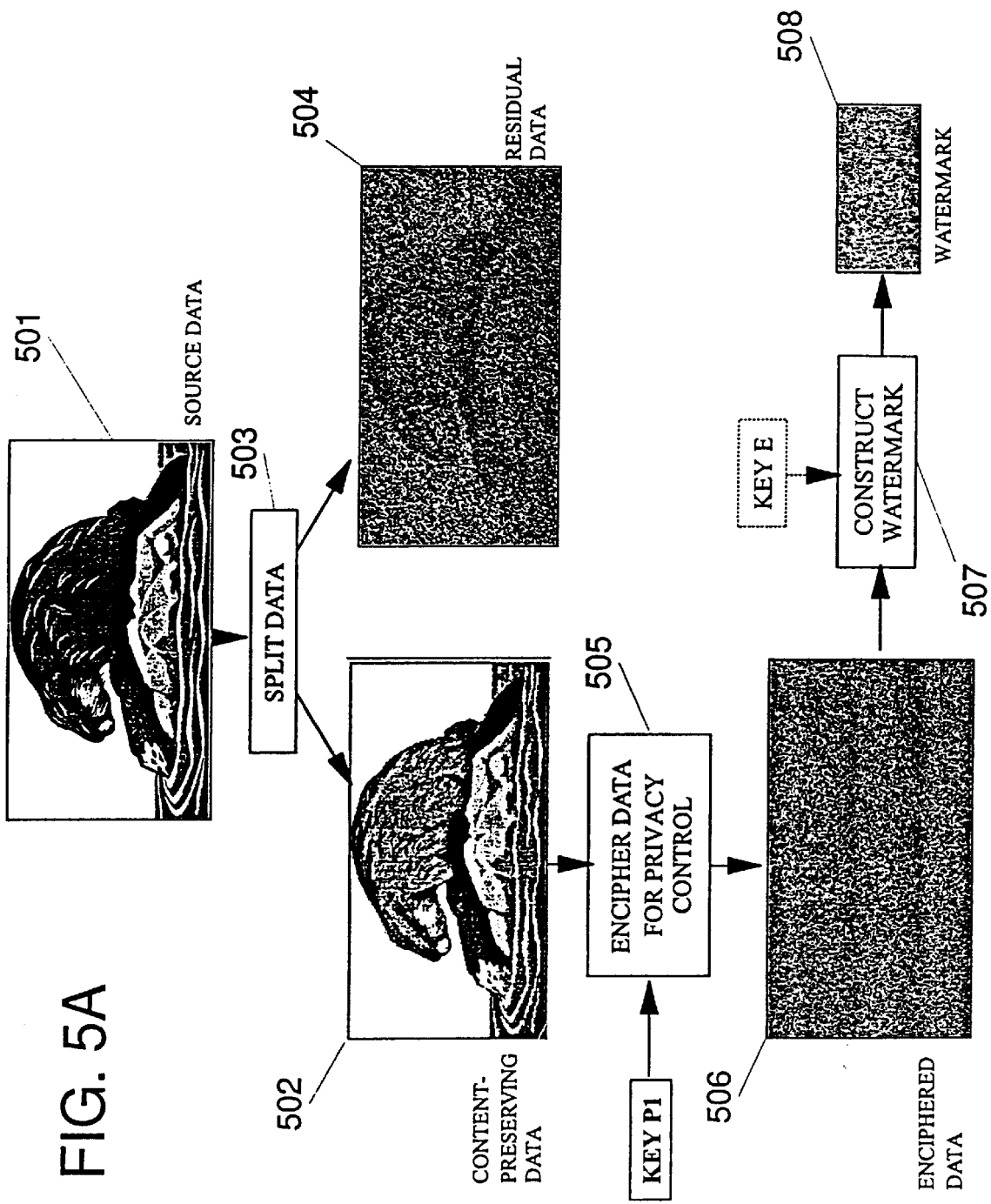

SECURED SIGNAL MODIFICATION AND VERIFICATION WITH PRIVACY CONTROL

BACKGROUND OF THE INVENTION

1. Field of the Invention

The present invention generally relates to imperceptible watermarking of human-perceptible data sets such as sound tracks, images, or videos, where such data sets have been digitized.

2. Background Description

An imperceptible watermark (hereafter watermark for short), is an alteration of the data set which is mostly not perceptible to a human, but can be recognized by a machine such as a computer. For instance, if the data set represents an image, the watermark should be (mostly) invisible; if the data set represents a sound track, the watermark should be (mostly) inaudible; and so on. The general principle of such watermarking has been disclosed in prior art.

Some watermarking schemes have been proposed to protect ownership, i.e., establish who is the rightful owner in situations when the ownership is contested. To the contrary we are interested here in watermarking techniques which are used to check the authenticity of a document by identifying the identity of the owner and/or the date of creation of a document. Alterations of the image should be detectable by an authentication algorithm, preferably in such a way that the location of the alterations can be located on the image. Authentication should still be possible on a portion of the image. Such watermarks are called fragile watermarks; they are modified (and the modification is detectable) by any modification of the image See, for example, "An Invisible Watermarking Technique for Image Verification", M. M. Yeung and F. C. Mintzer, *Proceedings*, International Conference on Image Processing 1997, vol. II pp. 680–683. This paper describes watermarking schemes where the owner of a data set incorporates an imperceptible watermark into the data set. As shown in prior art FIG. 1, the OWNER applies a watermarking scheme 102 to a source data set 101 to obtain the watermarked data set 103. The watermarked data set is distributed to the CUSTOMER 104. Both the OWNER and the CUSTOMER can authenticate 105 the data set by means of the A related invention is "The Trustworthy Digital Camera: Restoring Credibility to the Photographic Image", G. L. Friedman, *IEEE Trans. on Consumer Elec.*, vol. 39, no. 4, 1993, pp. 905–910, and U.S. Pat. No. 5,499,294 by G. L. Friedman, which describes a digital camera which uses cryptography to create a signature for authenticating the images generated. A signature is created for the entire image and appended to the image.

This invention of G. L. Friedman is not a watermark since the signature is appended to the image instead of being embedded in it. This has several drawbacks:

1) To authenticate an image, one needs more than just the image; both the image and the signature are needed.

2) The locations where changes to the image are made cannot be determined.

3) A cropped version of the image cannot be authenticated as the signature depends on the full image.

4) The authentication algorithm needs access to the human-readable part of the image. Therefore the authentication agent, if different from the CUSTOMER, will also see the human-readable content of the image, a situation which can be undesirable. Drawbacks 1 through 3 are easily corrected by using a fragile watermark instead of appending the signature. However, in the present state of the art, this is at the cost of:

5) Altering the image more severely than just modifying the least significant bits.

6) A signature which does not offer the widely recognized advantages of Secret Key/Public Key (in short SK/PK) encryption. One of the advantages is the inability of the authenticating agent to watermark an image in the case when the authenticating agent is not the owner.

The present invention will correct all of these drawbacks.

SUMMARY OF THE INVENTION

It is therefore an object of the present invention to provide a watermarking as faint, as secure, and as fast as possible with the possibility of tradeoffs between these requirements depending on the intended application.

It is also an object of the invention to provide watermarking using a SK/PK pair.

A further object of the invention is to embed a fragile watermark into an image such that the authentication agent does not need to know the human-readable content of the watermarked image in order to authenticate.

Another object of the invention is to provide the capability to authenticate a watermarked image without being able to watermark an image.

Still another object of the invention is to provide a watermarking scheme in which cropped images can be authenticated and detection of alteration can be localized, yet if pieces of the image are rearranged, the result ceases to be authentic.

Yet another object of the invention is to provide the capability to determine whether an image under consideration is cropped or not.

The present invention describes a data set distribution scheme where a possibly independent authentication agent can authenticate the data set without being able to read the human-readable data. Furthermore, optionally, the authentication agent A cannot watermark an image using the watermarking scheme of owner O. The general framework is presented in FIG. 2. The owner of the source data 201 transforms it into a watermarked data set 206 by the following steps. First, privacy control 202 is added to the source data. This allows authentication while preserving the privacy of the content of the data set. Next a watermarking algorithm is applied 203. This results in watermarked data which is privacy-enhanced 204. Thanks to the fact that the watermark is image dependent, it may be affecting only the least significant bits of the image, which allows maximal image quality preservation. One cannot extract the human-readable content of the source data from the privacy enhanced watermarked data, but can still authenticate the data 212. This watermarked privacy-enhanced data can be distributed from the owner to the authentication agent or to the customer. Furthermore, it can also be distributed between the authentication agent and the customer.

To recover the watermarked human-readable content, a privacy release algorithm is applied by the owner 205 or by the customer 209. The resulting watermarked data 206 can be distributed from the owner to the customer 211. The customer can then apply privacy control 210 to obtain the watermarked privacy-enhanced data 208. The owner, the authentication agent and the customer in this scenario could be different parties or the same, depending on the application. This framework is thus much more general than the prior art described in FIG. 1. The generality of this framework is further enhanced by the fact that some steps can be easily modified or omitted. For instance, all steps related to privacy protection may be avoided when there is no need for privacy: for instance an image distributor selling images to journals or individuals would not need these steps as opposed to a government agency keeping data on file which may need to have the authenticity of the files controlled while the content of the files remains secret.

As in the prior art (e.g. as disclosed by the Friedman paper), the present invention uses cryptography techniques for authentication. However, in Friedman's disclosure a signature is created for the entire image and the signature is appended to the image. In the present invention cryptography is used to create an embedded watermark which can be verified without needing to know the human readable content of the data set. This technique can also serve to prevent the authentication agent from watermarking an image.

The uses of the watermarking techniques of the present invention include authentication of data sets with encoding throughout the data set so that alterations can not only be detected, but also localized. Furthermore, given a cropped image, most of it can be authenticated. Also, the authentication algorithm can detect whether the image to be authenticated has been obtained by cropping a watermarked image.

Notice that the possibility of verifying portions of the data set and localizing the places where changes are made allows preservation of the information content of images which have not been altered intentionally but have been only locally affected by transmission or during storage or retrieval for instance from a magnetic recording device: both communication lines and storing devices usually have some rate of failure. If, as in Friedman's paper, a signature is created which depends on the entire image, changes caused by transmission or storage would result in the image not being authentic, which can be undesirable. In the present invention, if the changes to the image are localized to areas of the human-readable content which is not essential, the image could still be considered authentic in some applications.

There are three main aspects to this invention. First of all is the ability to allow a watermarked data set to be authenticated without the authentication agent being able to obtain the human-readable content of the data set. This forms the privacy control aspect of the invention.

The second aspect is the ability to generate a data set dependent watermark and embed it into the least significant bits of the data set. This implies that the watermark is as faint as possible.

The third aspect is the ability to authenticate cropped versions of the watermarked data set and the ability to detect whether a watermarked data set has been cropped. It also prevents a "cut and paste" attack on the watermarking scheme, i.e., rearranging portions of the watermarked data set will result in a data set which is not authentic.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

In general, a digitized human perceptible data set is presented as a $N_1 \times n_2 \times \ldots \times n_M$ array I of N-bit numbers or a collection thereof. For instance, M=1 for a standard sound track, M=2 for a gray-scale image. In the case of a stereo or more generally an m-track (with $m \geq 2$) sound track, one can either consider this as M=2 with $n_2$=m, or as $m \geq 2$ arrays with M=1. Similarly, a color image could be thought of as a single array with $M \geq 3$ or three or more arrays with M=2 (here, 3 is the minimal number of components for a color image). Thus, an audio-video document can be represented by an array with M=4 for the video and an array with M=2 for the (stereo) sound.

We address a variety of scenarios, and shall first introduce some terminology to describe the terms used in later sections. The image I will be watermarked by its owner O who transforms it to a watermarked image $\tilde{I}$ (in some cases, I is destroyed, in some cases, I never existed and the image is directly created in the watermarked form). The watermarked image is accessible by the customer C who wants to check that she/he access an authentic watermarked image of the owner O. The authentication can be made by an authentication agent A. Thus we have up to three parties, but any two of them can be identical in some cases. Some of the scenarios covered by this invention can be described as follows:

Scenario 1. O may want to check that some of his/her old images are still authentic, and may wish to authenticate them with no external assistance, in which case O=C=A.

Scenario 2. O may wish to be the only authentication agent (in which case A=O).

Scenario 3. O may prefer to enable any customer to authenticate with no need of external help (in which case A=C). Then the watermarking should be made using a Secret Key/Public Key (hereafter SK/PK) pair.

Scenario 4. The image could be sensitive documents such as bank account records, social security documents. It would be desirable that A has no access to the human-readable content of the image, and no capability to watermark the image.

The general mechanism of the invention is decomposed into several steps to allow for several scenarios, but in some cases, one or several or these steps correspond to nothing being done.

Figure 3A:
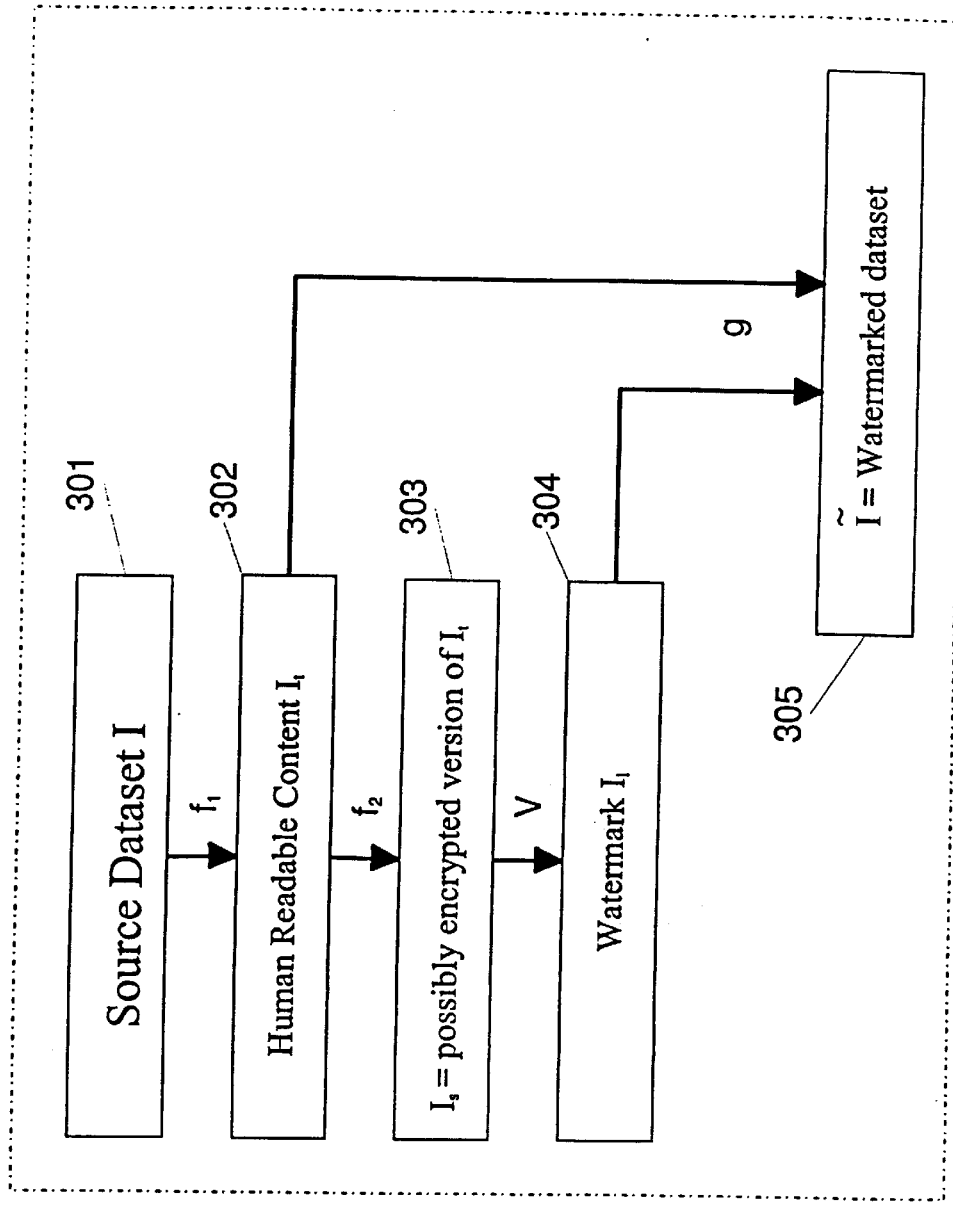
FIG. 3a describes the steps the owner undertakes in the present invention to watermark a data set.

Turning now to FIG. 3a, there is now described the watermarking mechanism: The owner of a data set I constructs a watermarked data set $\tilde{I}$ as follows. Starting with an initial data set I 301, the data set $I_t=f_t$ (I) 302 is extracted (via the map $f_t$). $I_t$ contains most of the content of the data set, including the human-readable content. One example of $I_t$ would be the higher order bits of the data set (in case of image or audio data). The data set $I_t$ is then converted to the data set $I_s=f_2$ ($I_t$) 303 via the map $f_2$. Depending on the application, $I_s$ can be identical to $I_t$ (i.e., $f_2$ is the identity function) or $I_s$ can be an encrypted or hashed version of $I_t$. This part of the invention ($I_s$ 303) constitutes the privacy control.

$I_s$ is then converted into the watermark $I_l=V(I_s)$ 304 via a function V which is known to the authentication agent. The function V can depend on the owner of I. Then the watermarked image $\tilde{I}$ 305 is constructed by combining $I_t$ and $I_l$:

$$\tilde{I}=g(I_t, I_l)$$

Alternatively, $\tilde{I}$ can also be defined implicitly:

$$g(I_t, I_l, \tilde{I})=0$$

In this case, an iterative algorithm is used to construct $\tilde{I}$ from $I_t$ and $I_l$. In any case, a function g is used such that I (or $I_t$) is perceptibly similar to $\tilde{I}$. For example, in the case of an image or audio signal $I_t$ can be all the data bits of I except for the least significant bits and $\tilde{I}$ is constructed by using $I_t$ as the high order bits, and $I_l$ as the least significant bits.

The function g also has the property that there exists extraction functions $h_t$ and $h_l$ which extract $I_t$ and $I_l$ from $\tilde{I}$, i.e., $I_t=h_t(\tilde{I})$ and $I_l=h_l(\tilde{I})$. For example, in the case where $I_t$ is the higher order bits of $\tilde{I}$ and $I_l$ is the least significant bits of $\tilde{I}$, it is obvious how $h_t$ and $h_l$ are defined.

Figure 1:
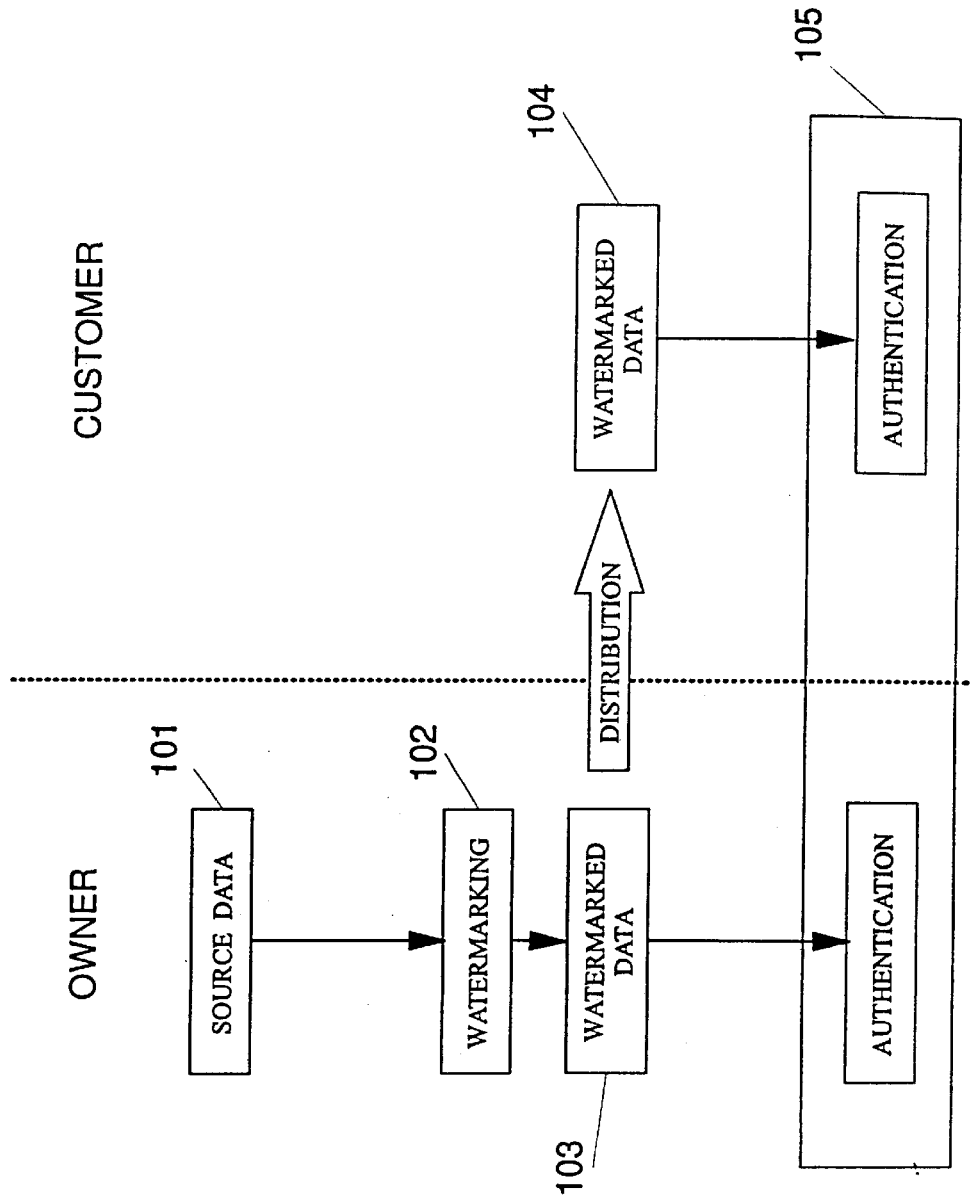
FIG. 1 describes the watermarking and authentication scheme in the prior art.
Figure 2:
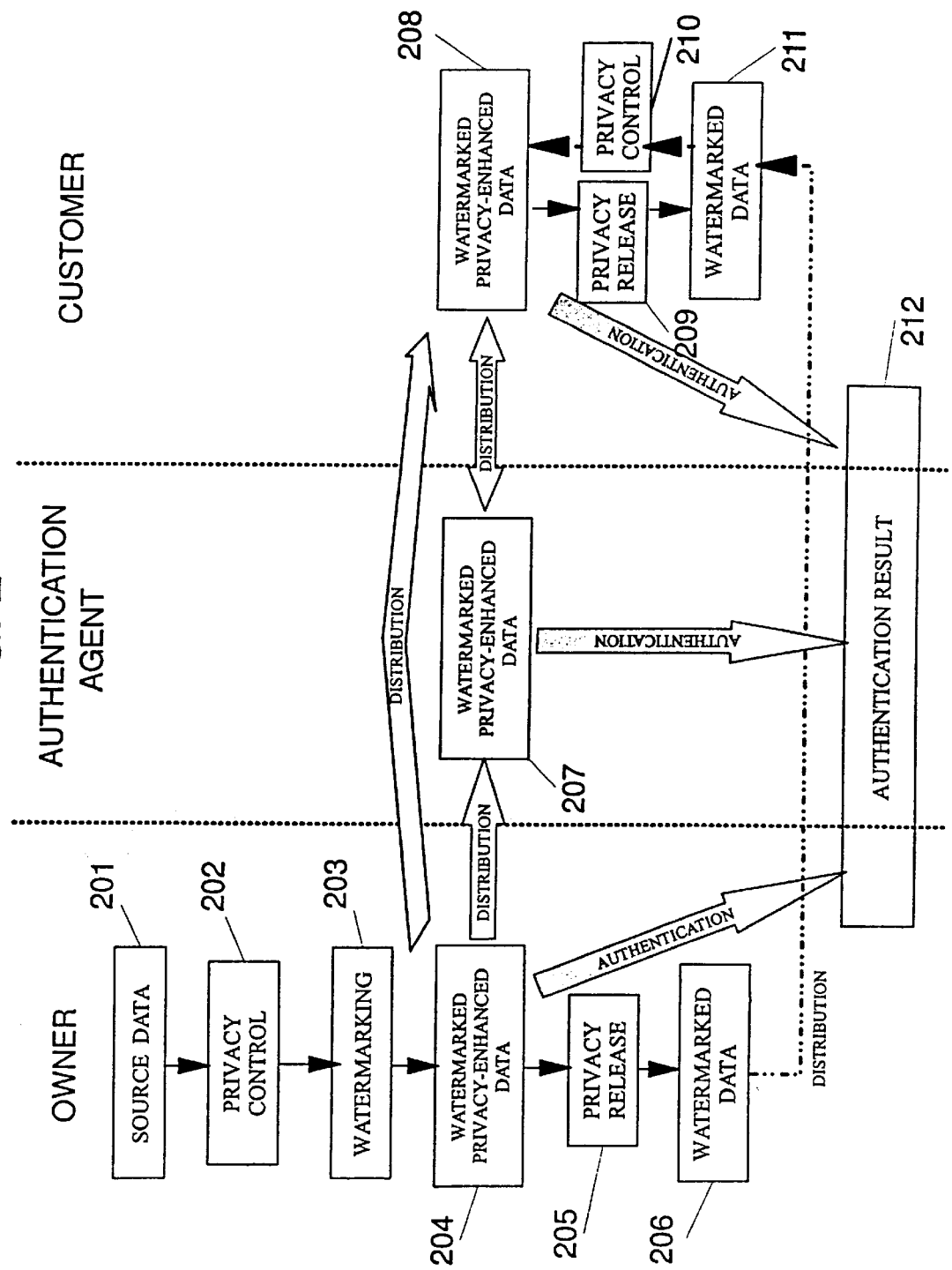
FIG. 2 describes the proposed watermarking and authentication scheme with privacy control.

The transformation from I to $\tilde{I}$ as described above with reference to FIG. 2 and FIG. 3a creates a privacy encoded watermarked version of the original image.

Figure 3B:
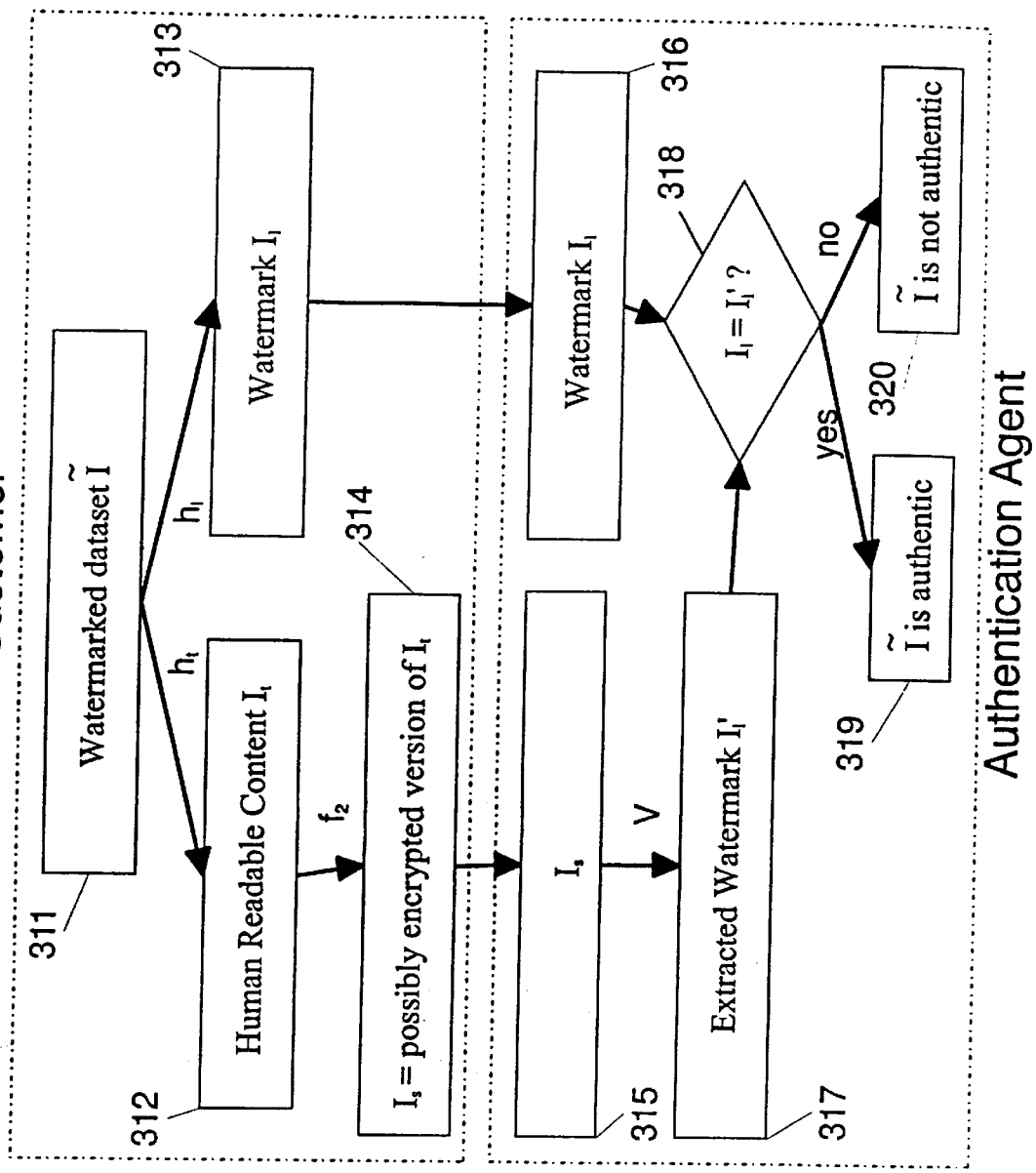
FIG. 3b describes the steps the authentication agent and the owner undertakes to authenticate a watermarked data set.

Turning now to FIG. 3b there is shown the verification process: A customer would like to have a watermarked image $\tilde{I}$ 311 authenticated. The customer extracts $I_t$ 312 and $I_l$ 313 (using $h_t$ and $h_l$), constructs $I_s=f_2(I_t)$ 314 from $I_t$ and submits to the authentication agent the data sets $I_s$ 315 and $I_l$ 316. The authentication agent then uses function V to construct $I_l'=V(I_s)$ 317 from $I_s$ and compare $I_l'$ with $I_l$ 318. If they are identical 319, then the watermarked image $\tilde{I}$ is authentic. Otherwise, it is not 320.

To prevent anybody except for the owner to be able to watermark an image, public key cryptography is used and V is decomposed as $V=V_l$ O $V_2$ where $V_1^{-1}$ is known publicly, but $V_l$ is secret and known only to the owner. Furthermore, it is considered computationally infeasible to determine $V_l$ given $V_1^{-1}$. In that case the authentication agent construct $V_2(I_s)$ and compare it with $V_1^{-1}$ ($I_l$). If they are identical, then the watermarked image $\tilde{I}$ is authentic. In many applications, $V_2$ can be chosen to be the identity function.

Figure 3C:
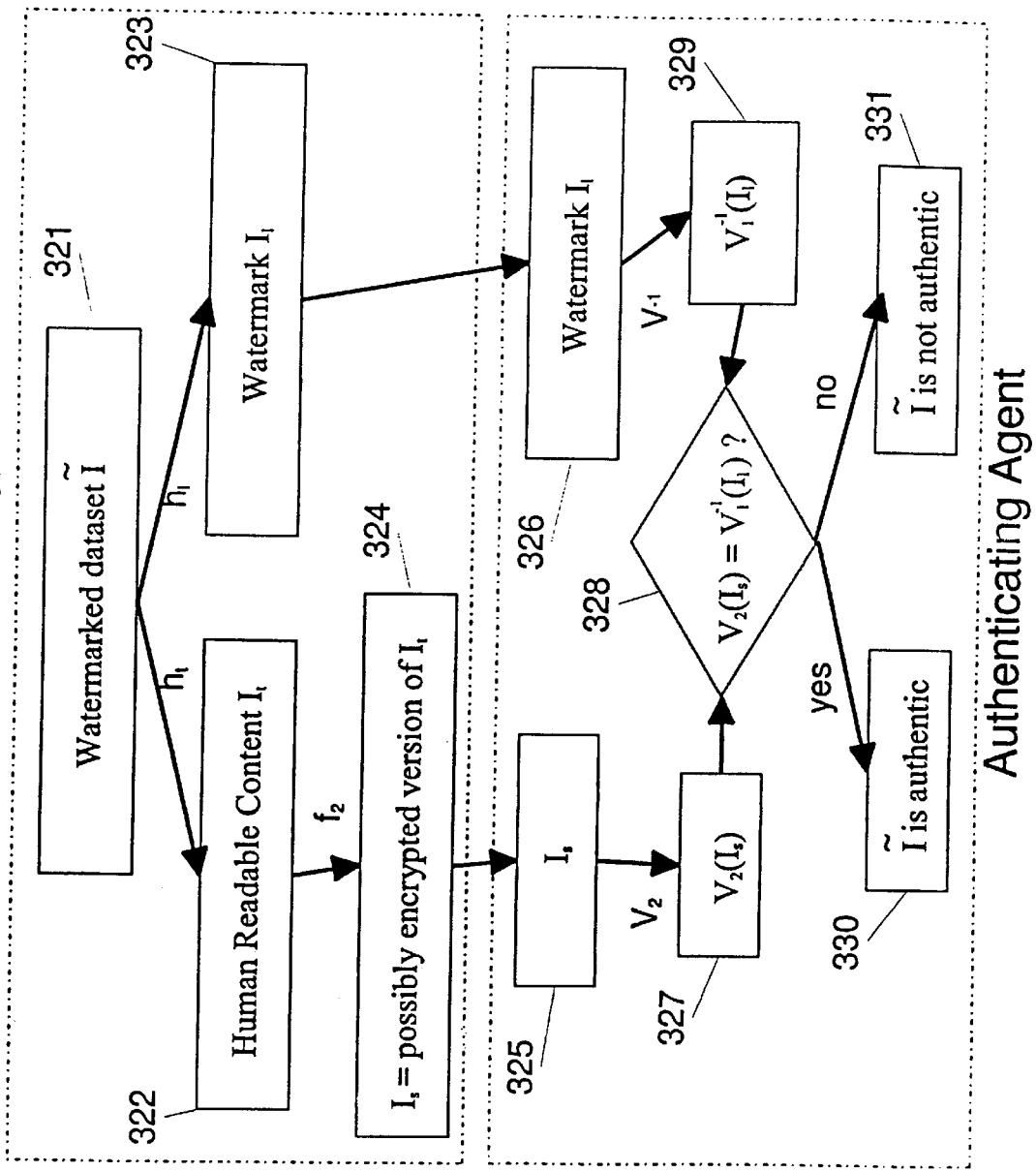
FIG. 3c is the same as FIG. 3b, except that public key cryptography is used to prevent the authentication agent from watermarking a data set using the owner's watermark.

Using FIG. 3c we now illustrate the verification process for the case where public key cryptography is used. The steps for the owner are the same as shown in FIG. 3b. The authentication agent, however constructs $-V_2(I_s)$— 327 and $V_1^{-1}$ ($I_l$) 329. $V_2(I_s)$ is then compared with $V_1^{-1}$ ($I_l$) in decision block 328. If the answer is yes, the watermarked data set $\tilde{I}$ is authentic 330. Otherwise, it is not 331.

In both FIG. 3b and FIG. 3c, if $I_s$ is an encrypted or hashed version of $I_t$, then the authentication agent cannot read the content of $I_t$ which contains the human-readable content of the data set. If in addition $I_l$ does not reveal the human-readable content of the data set (as is usually the case, since $I_l$ are the least significant bits), then the authentication agent can authenticate the data set without being able to read the human-readable content of the data set. This provides the privacy control aspect of the invention.

In the preferred embodiment, cryptographic techniques are used at two levels. First, they are used for privacy control, i.e., in the definition of $f_2$. Second, cryptography is used for authentication, i.e., in the definition of V.

Figure 4:
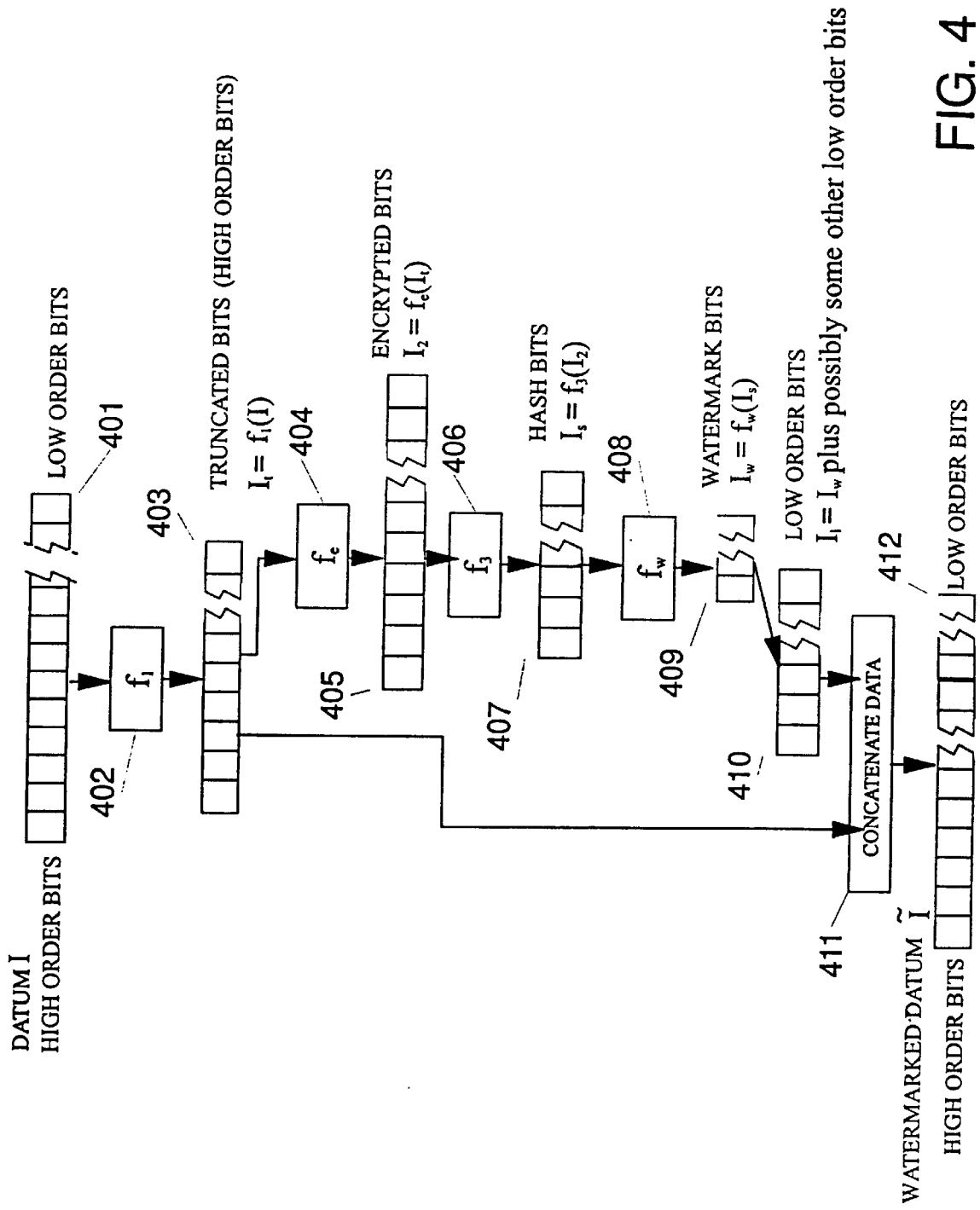
FIG. 4 illustrates the steps to watermark an data set in the preferred embodiment of the invention.

In FIG. 4 there is shown the details of how the owner of a data set I constructs a watermarked image $\tilde{I}$ in the preferred embodiment. A description of the specific cryptographic techniques used can be found in *Handbook of Applied Cryptography*, by Alfred J. Menezes, Paul C. van Oorschot and Scott A. Vanstone, CRC Press, 1997. Starting with an initial data set I 401, a truncated data set 403 $I_t=f_t$ (I) is extracted via the map $f_t$ 402. $I_t$ contains most of the content of the data set, including the human-readable content. For instance, $I_t$ can be constructed by keeping only the higher order bits of the original data set I.

The data set $I_t$ is then converted to the second data set 405 $I_2=f_e$ ($I_t$) via the map $f_e$ 404. Depending on the application, $I_2$ can be identical to $I_t$ (in which case $f_e$ is the identity function) or $I_2$ can be an encrypted version of $I_t$. In some cases, $I_2$ will contain redundancies and be bigger than $I_t$: for instance, in the preferred embodiment, $I_t$ will be covered by several overlapping regions, each of which will be mapped to $I_2$.

The second data set $I_2$ is then used to compute the reduced data set 407 $I_s=f_3$ ($I_2$) via the map $f_3$ 406. It is possible that $I_s=I_2$, but in several applications, $f_3$ will be chosen as a hash function (to reduce the size of the data). In the case of scenario 3 or 4 above, $f_3$ would more precisely be constructed as a cryptographic hash function H which might be publicly known. Then, given any message M such as $I_2$, it is easy for anyone to produce $I_s=H(M)$ given M, but considered computationally infeasible for anyone to find two different messages M and M' with the same hash value H(M)=H(M'). Also, it is considered computationally infeasible for anyone, given a hash value Y, to find a message M satisfying H(M)=Y. One such hash function is the Secure Hash Algorithm (SHA-1). In terms of $f_2$ of FIG. 3a, $f_2=f_3$ O $f_e$.

Next, $I_s$ is used to compute the functional watermark $f_w$ 408. The functional watermark will associate an effective watermark $I_w$ 409 to I, computed as $I_w=f_w$ ($I_s$): here $I_w$ is an array of proper size. In some cases, $I_w$ will be the collection of all least significant bits ($I_l$) of the watermarked image, in which case we denote this as $I_w=I_l$, but it may also be only a subset of $I_l$ if one needs fast coding (such as in video) and/or as faint an effective watermark as possible.

The function $f_w$ will depend on the reduced image $I_s$ on the owner O, but also possibly on the time T and/or place P when and/or where the watermarking is done: in symbol, $f_w=F(I_s,O,T,P)$. In some applications, $f_w$ can be constructed using the SK part of a SK/PK pair (or a collection thereof to allow for cropping): the public part of the pair will be denoted by $f_p$. Then, the authentication agent A can check that $I_w$ is what should be computed as $F(I_s,O, T,P)$ ($I_s$)=$f_w$ ($I_s$), but cannot compute $I_w$ out of $I_s$,O,T and P. In general, $f_p$ stands for the function needed to verify that $f_w$ is used for watermarking (in some case like in scenario 1, $f_p$ can be chosen as $f_w$)

Once $I_w$ is computed, it is used to generate the low order bits $I_l$ 410. As discussed before $I_w$ 409 could be equal to $I_l$ or it could be a subset of $I_l$, in which case the other bits of $I_l$ are chosen to be as in I or to be arbitrary. The watermarked image $\tilde{I}$ 412 is then composed out of $I_t$ and $I_f$. For instance, one may chose $\tilde{I}$ as $I_t$ concatenated 411 with $I_f$. But more complicated protocols can be preferred.

The authentication of an image can then be implemented according to the precise protocol chosen to compose $\tilde{I}$, in a manner which should be obvious to anyone versed in the art of cryptography. It is practical to embed all information about O, T, and P (as needed) in a non-secret piece of $I_w$ (repeated many times over the image in case one allows for authentication of cropped images): the locations where such data is contained in $\tilde{I}$ could be standardized and serve as locators to ease the authentication process. In such case, A (who has access to $f_p$) needs only to be communicated $I_s$ and $I_w$ to perform the authentication and will be unable to guess what $I_t$ is if a cryptographic hash function is used as $f_3$. If a SK/PK pair is used, A will also be unable to forge a watermark for $I_t$.

Figure 5B:
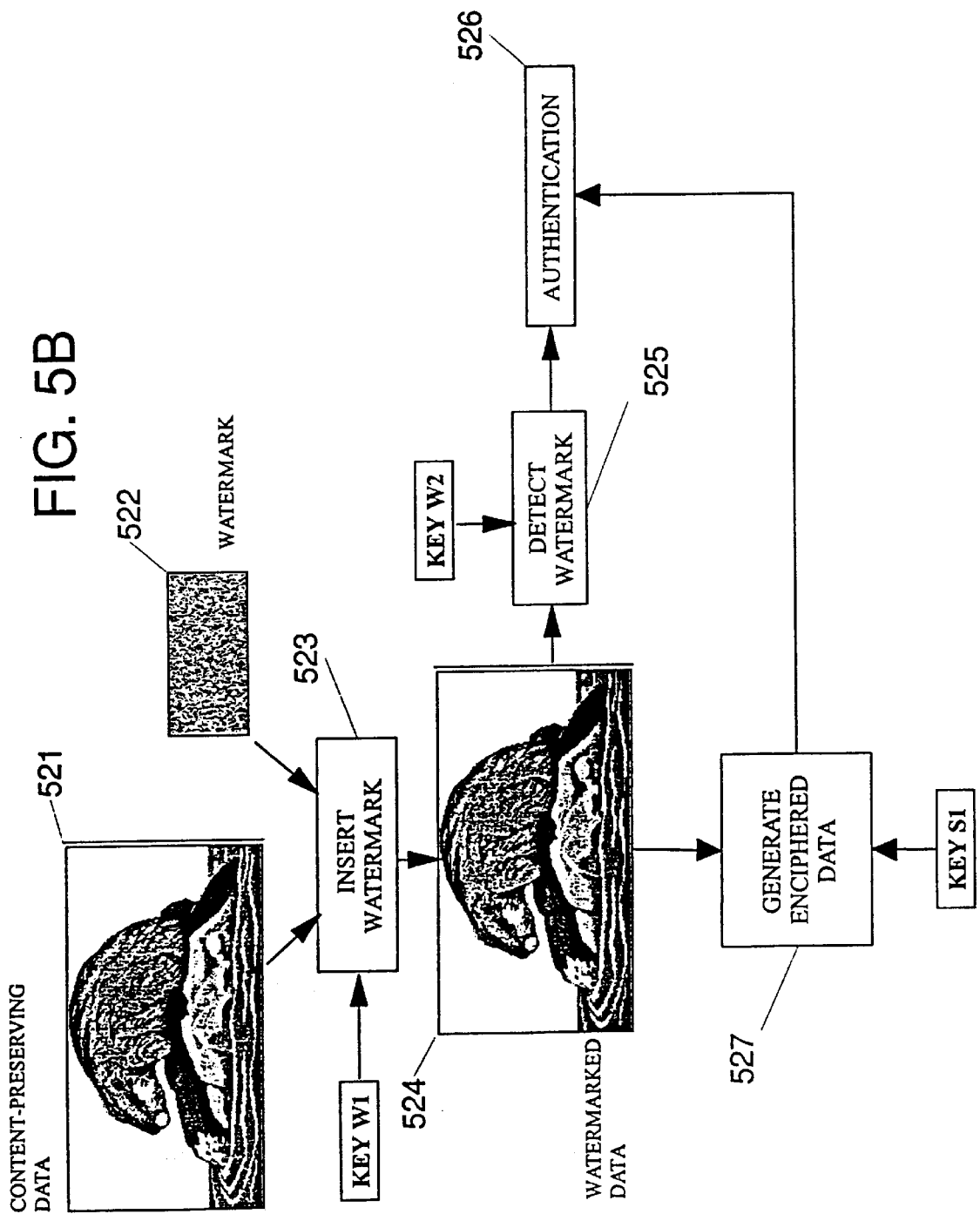
FIG. 5 illustrates a sample implementation of the process of watermarking an image and its authentication.

A schematic diagram of a sample implementation of the process of watermarking an image and its authentication is shown in FIG. 5a–b. Referring now to FIG. 5a, a source image 501 is split 503 into a human-perceptible content-preserving portion 502 and a residual portion 504. This residual portion will be replaced by the watermark in the watermarked image. The content-preserving portion is enciphered in block 505 for privacy control. The enciphered data 506 is then used in block 507 to construct a watermark 508.

Referring now to FIG. 5b, the watermark 522 is inserted into the content-preserving portion 521 in block 523 to generate the watermarked image 524. For authentication, block 525 extracts the watermark from the watermarked data and block 527 generates the enciphered data from the watermarked data and these two pieces of information are used in the authentication protocol 526.

Next we describe the preferred embodiment for specific types of data sets. Note that in general we work with the uncompressed version of the data set.

Grayscale Images

The picture is m by n pixels, each of which is represented by 8 bits of information. We will call the 7 most significant bits the "high bits" and the eighth (least significant) bit the "low bit". The watermarking process will respect the high bits but alter the low bits. Even though we assume that each pixel is represented by 8 bits of information, this implementation is easily adaptable by anyone skilled in the art to the case where each pixel is represented by N bits of information. The same can be said for other types of data sets, as described later.

Figure 6A:
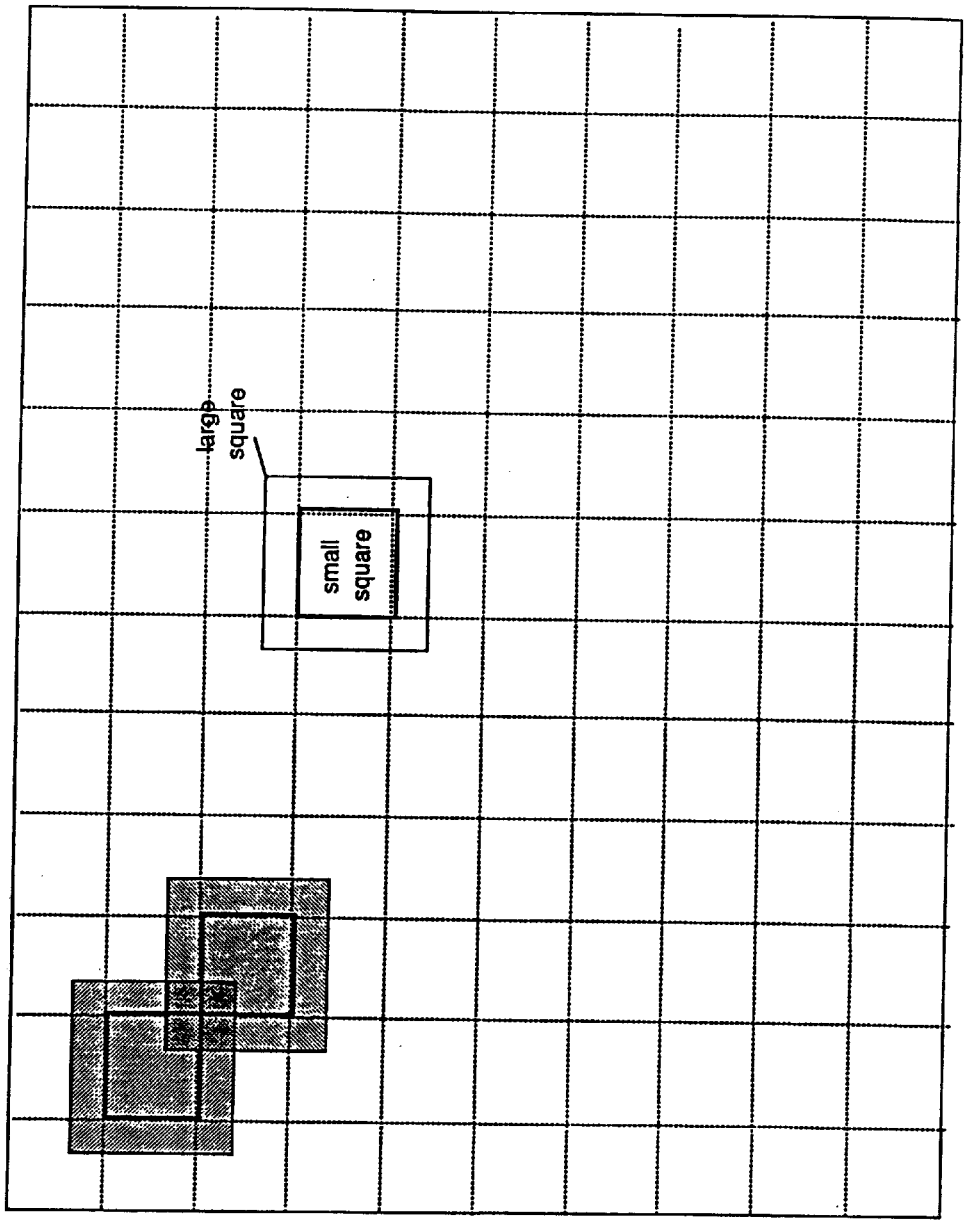
FIG. 6a illustrates the large and small squares used in the preferred embodiment of watermarking images.
Figure 6B:
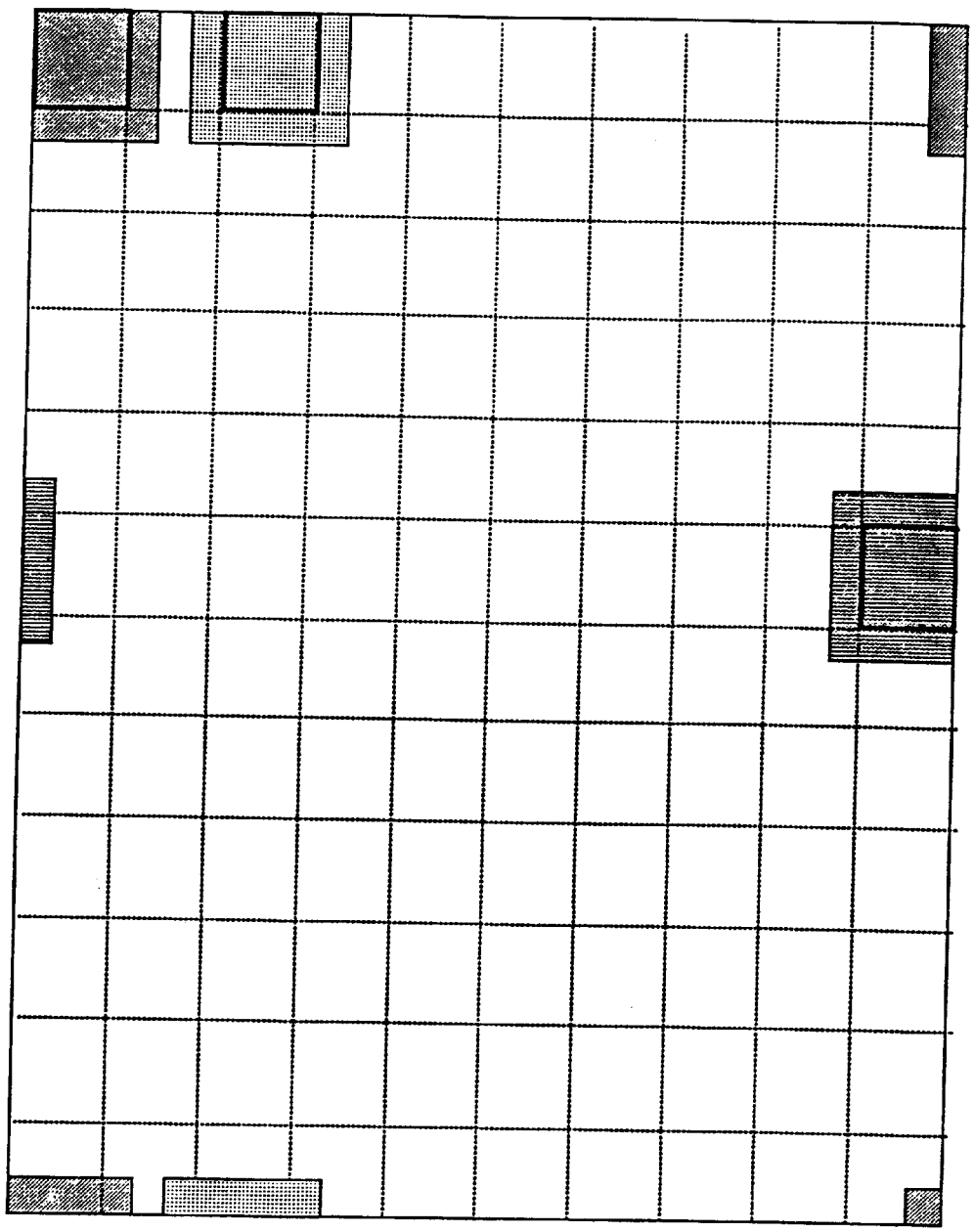
FIG. 6b illustrates how the large squares can wrap around the edges of the image.

Decompose most of the picture (possibly excluding the border) into small squares of 24 by 24 pixels such that each small square is embedded in the middle of a large square of size 32 by 32 pixels. The large squares overlap but the small square do not overlap, as shown in FIG. 6a. Periodic boundary conditions can be used in determining the large squares, as indicated in FIG. 6b. In other words, large squares which have portions lying outside the image border are "wrapped" around to the border at the opposite side.

As usual, the use of periodic boundary conditions allows use of the method for boundary points and interior points of the image in exactly the same way, with no need of further adaptation. In the present case, periodic boundary conditions also allow for a further verification to determine whether an image has been cropped or not.

Figure 7A:
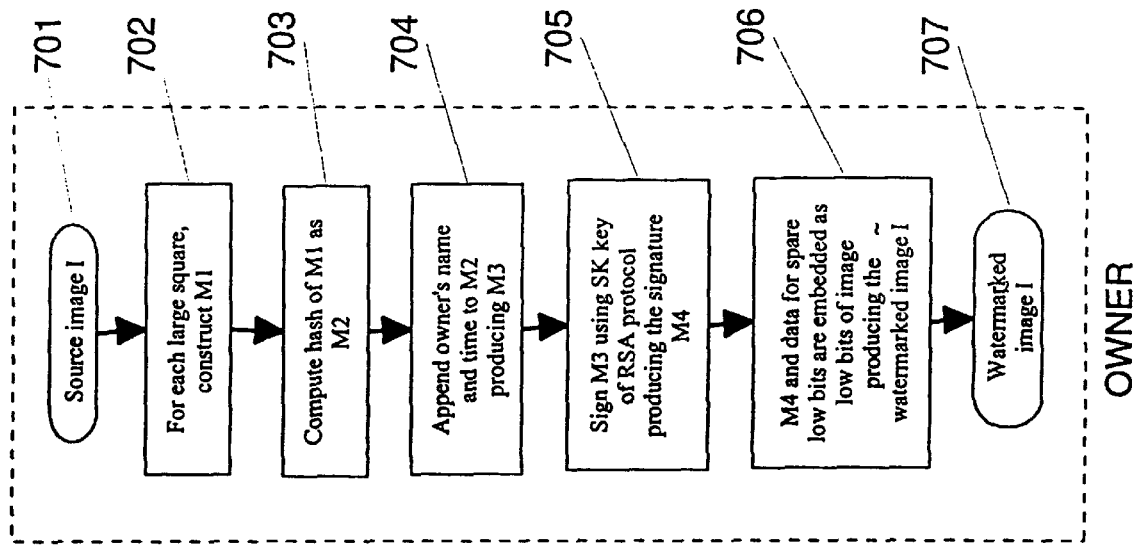
FIG. 7a indicates the steps in the preferred embodiment for watermarking images.

Referring now to FIG. 7a, starting with a source image I 701 broken up into non-overlapping small squares and overlapping large squares with periodic boundary conditions, for each large square collect the high bits of all 1024=32×32 pixels (i.e. 7×1024=7168 bits) into a message M1 with 7168 bits 702. The collection of all these messages M1 form $I_2$. Compute the 160-bit hash of this message M2=H(M1) with 160 bits where H is chosen as SHA-1.703. Append the owner's name and time to produce a 512-bit message M3 for each M1 704. Here the owner's name can include other data such as the name of the image, the date, or place of creation of the image.

We choose the RSA protocol, described in U.S. Pat. No. 4,405,829, as a method to generate and use a SK/PK pair in order to allow for public authentication: several other methods could also be used. The signing function in the RSA protocol is denoted by SIGN and the verification (authentication) function in the RSA protocol is denoted by VERIFY.

Next compute the RSA signature M4=SIGN(SK,M3) of 512 bits 705. Place these 512 bits in the low order positions of the 576=24×24 pixels in the small square, obliterating the existing low bits. Since there are 576 low order bits, there are 576−512=64 bits left for other data in each small square. These 64 bits will be called the spare low bits 706.

We chose the spare low bits to always be dispersed in a standardized way in the small squares so as to be used as locators. In all cases when SK/PK pairs are used, the owner's name, time, and public key PK, are assumed to be available to anyone who wants them: we chose to embed the owner's name and the time (or some portion of it) in the spare low bits (of possibly several squares). PK can also be recalled there (possibly using the spare low bits of several squares), but should also be publicly accessible by other means.

Assume that a customer wishes to verify whether a data set (or a part of it) has been altered. He has access to a portion of the data; it may have been cropped, but he still wants to verify that the portion available to him is the original unaltered version.

If the data set has been cropped, the alignment of large squares within the picture needs to be determined. If the name of the owner has been embedded in the spare low bits, then it can be searched for in the data set to find the correct alignment. Another possibility is to use a small fixed synchronization pattern embedded into the spare low bits to determine the correct alignment.

Alternatively, a trial and error method can be used to determined the correct alignment by repeating the verification procedure 576=24×24 times, once for each possible alignment.

Cropping results in border pixels of the image possibly not being verifiable. The amount of these non-verifiable border pixels can be used to determine whether the image has been cropped or not (or whether the image has been altered to fake the fact that the image is cropped).

Figure 7B:
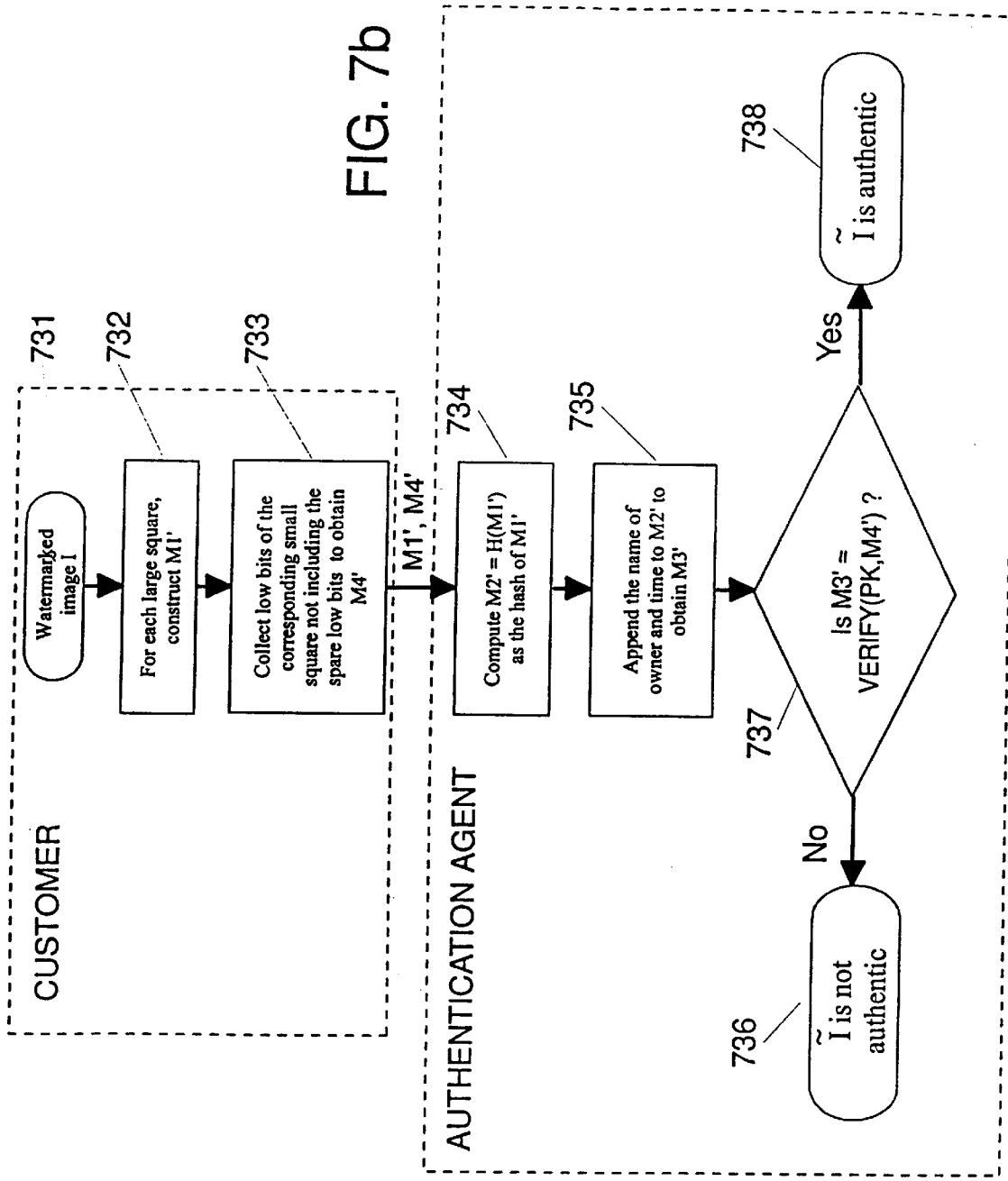
FIG. 7b indicates the steps in the preferred embodiment of authenticating watermarked images when privacy control is not used.
Figure 7C:
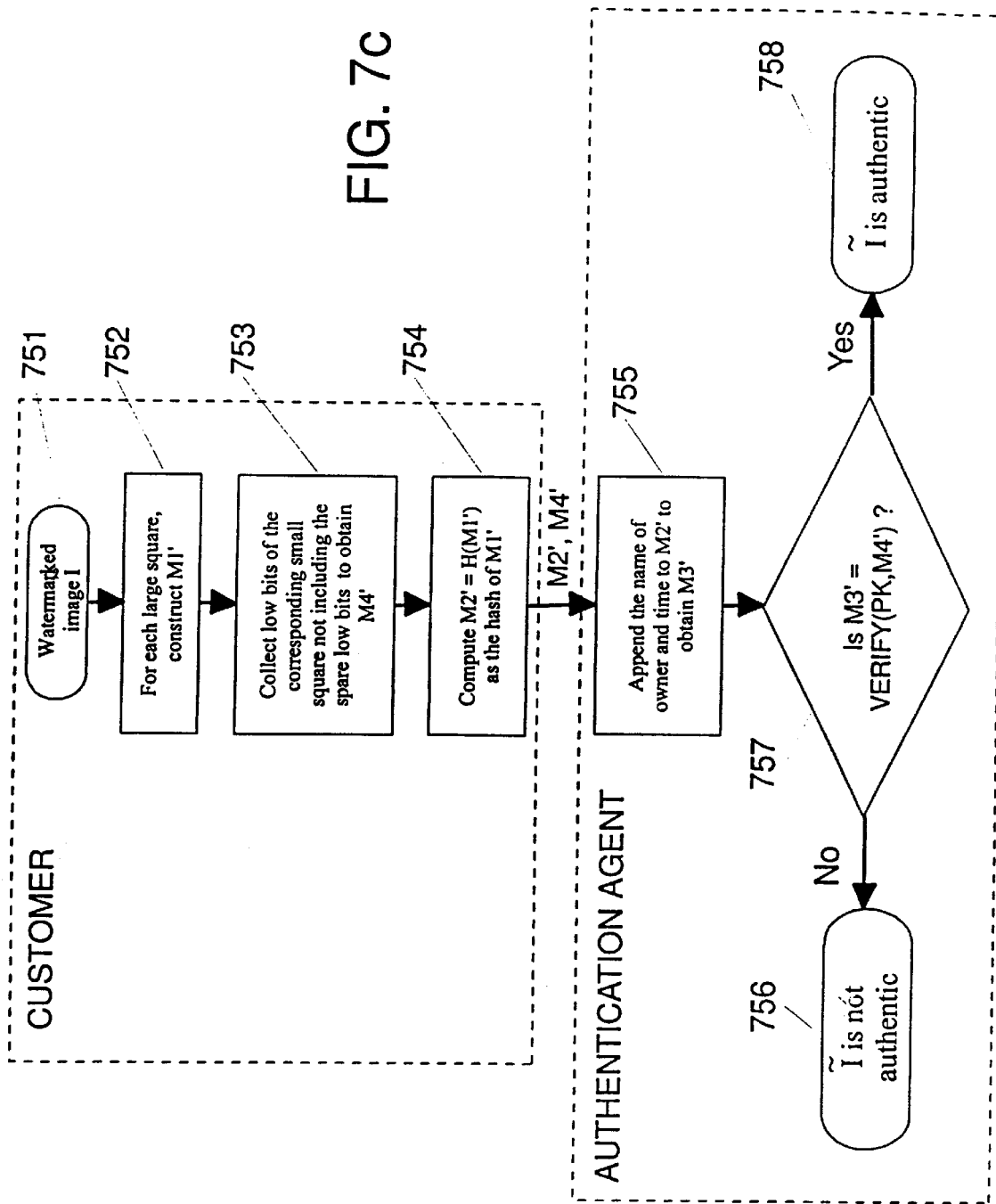
FIG. 7c indicates the steps in the preferred embodiment of authenticating watermarked images when privacy control is used.

The customer proceeds as follows. Referring now to FIG. 7b, starting from a watermarked image $\tilde{I}$ 731, for each large square of the data set, collect the high bits into a message M1' 732. Collect the low bits of the corresponding small square and produce a 512-bit message M4' 733. The customer then has two choices:

1. Submit M1' and M4' to the authentication agent (FIG. 7b);
2. Compute the hash M2'=H (M1') and submit M2' and M4' to the authentication agent (FIG. 7c).

In either case, the authentication agent can compute or retrieve M2' (734 in FIG. 7b or 754 in FIG. 5c). In case M2'

(rather than M1') is submitted to the authentication agent, the authentication agent has no access to M1' and thus cannot read the human-readable content of the data set. The authentication agent then perform the authentication as follows. First it collects the owner's name, the time and PK. Alternatively, the owner's "name" and/or "time" and/or PK could have been collected by the customer and submitted to the authentication agent, for instance when they are embedded into the spare low bits of the watermarked data sets. Next the name and time is appended to M2' to obtain M3' 735. Then, as shown at decision block 737, compute VERIFY(PK,M4') and see whether M3' is equal to VERIFY (PK,M4'). All this can be done with publicly available information. If M3'=VERIFY(PK, M4'), then this implies that M4'=SIGN(SK, M3').

If each large square satisfies the verification equation 738, then the customer can be sure that the data has not been altered (other than by cropping).

When M2' rather than M1' is sent to the authentication agent, the authentication flowchart is as shown in FIG. 7c. All the steps are identical as in FIG. 7b, except that the computation of M2' is done by the customer rather than by the authentication agent.

The foregoing description of an embodiment of the invention focuses on gray-scale images, however, the invention is readily applicable to other data sets in a more general sense, so that the word "image" could be replaced by any other human perceptible data sets like color images, video and audio, as will now be explained.

Color Images

With color images, each pixel has 24 bits, 8 bits for each of three primary colors. We will use three bits of each pixel (the lowest bit of each primary color) as our "low bits", and the other 21 bits as "high bits". The small square will be 14×14 pixels, and the large square 22×22. So the low bits will number 588=3×14×14, and the high bits will number 10164=21×22×22. The number of spare low bits is now 588−512=76. The rest of the scheme remains unchanged.

Audio Waveforms

With audio waveforms, assume the data set is a one-dimensional array of samples, with each sample a 16 bit number. It is then relatively straightforward to adapt to this case. For example, instead of small and large squares, we have small and large windows of data with the small windows in the middle of the large windows. We use small windows of 600 samples, while the large windows will be 1000 samples. The large windows should overlap, while the small windows do not. The rest of the scheme is similar to the grayscale image case and can be deduced by anyone who understands this invention.

Video

As video data in general are processed at high speed, this application requires rapid implementation. One way to increase the speed of the algorithm is to use only a subset of the low bits dispersed over the image as carrying the watermark. The locations of these points are obtainable from PK and/or readable data on the first image and vary from one frame to the next. If possible cropping is intended, such data can be repeated periodically. The watermark on each frame depends on the image on that frame and on neighboring frames to prevent undesirable cropping and cut and paste attacks but allow for detectable cropping. Marking only on dispersed dots can also be used on still images if a watermark as faint as possible is desired.

The preferred embodiment of the invention demonstrates the following advantages, among others.

The small squares are embedded into large squares to prevent a cut and paste attack, i.e. an image constructed by rearranging pieces of an authentic image will cease to be authentic.

In the case where the third party submits M2' and M4' to the authentication agent for verification, the authentication agent cannot read the human-readable content of the watermarked data set. Therefore, this provides a level of privacy to the human-readable content of the data set.

The use of public-key cryptography means that the authentication agent can authenticate a data set but cannot watermark a data set.

The watermark is embedded in the least significant bits of the data set, therefore making it imperceptible.

If the watermarking of the original image adopts periodic boundary conditions, then the authentication agent can determine whether an image has been cropped or not by checking whether the border is authenticated or not.

If the watermarked image has been altered, the authentication agent can approximately determine the location of the alteration.

While the invention has been described in terms of a preferred embodiment implemented in several particular types of data sets, those skilled in the art will recognize that the invention can be practiced with modification within the spirit and scope of the appended claims.

Having thus described our invention, what we claim as new and desire to secure by letters patent is as follows:

1. A method for generating a watermark and using said watermark to authenticate a human-perceptible source data set, comprising the steps of:

extracting higher order bits from said source data set;

applying public key cryptography to said higher order bits to generate an encrypted set of bits;

generating a watermark from said encrypted set of bits;

inserting said watermark into the least significant bits of said source data set, thereby creating a watermarked version of said source data set; and authenticating and/or allowing other parties to authenticate that a cropped version of said watermark corresponds to said human-perceptible source data set so that cropped images can be recognized as cropped images and authenticated as cropped images and/or that it can be recognized that blocks within the image have been rearranged.

2. The method of claim 1, wherein a third party having said watermarked version alone cannot extract said watermark to apply said watermark to additional source data sets.

3. A method for generating a watermark and using said watermark to authenticate a human-perceptible source data set, comprising the steps of:

extracting higher order bits from said source data set;

generating a watermark depending on said higher order bits and, optionally, also depending on additional information;

inserting said watermark into the least significant bits of said source data set, thereby creating a watermarked version of said source data set;

authenticating and/or allowing other parties to authenticate that said watermark corresponds to said human-perceptible source data set, wherein said authenticating step is performed on a cropped version of said watermarked version and cropping is detected by said authenticating step; and extracting and/or allowing other parties to extract some or all of said additional information used to create said watermark.

4. A method for generating a watermark and using said watermark to authenticate a human-perceptible source data set, comprising the steps of:

extracting higher order bits from said source data set;

generating a watermark depending on said higher order bits and, optionally, also depending on additional information;

inserting said watermark into the least significant bits of said source data set, thereby creating a watermarked version of said source data set;

authenticating and/or allowing other parties to authenticate that said watermark corresponds to said human-perceptible source data set, wherein said authenticating step can determine the approximate location of any alteration in said source data set; and extracting and/or allowing other parties to extract some or all of said additional information used to create said watermark.

5. A method for using watermarks to distribute and authenticate human perceptible source data sets, comprising the steps of:

digitizing and segmenting a human perceptible source data set into a plurality of non-overlapping digitized segments and a corresponding plurality of overlapping digitized segments, wherein each non-overlapping segment is embedded within its corresponding overlapping segment in the same manner, and wherein said digitizing comprises a digital representation of said human perceptible source data set, said digital representation consisting of digital elements, each said element being divided into high order bits and low order bits, said high order bits being sufficient to preserve the human perceptibility of said source data set;

creating a watermarked version of said source data set, wherein said step of creating a watermarked version of said source data set further comprises, for each of said plurality of corresponding segments:

adding privacy control to said high order bits of said overlapping segment, resulting in a data set consisting of encrypted high order bits;

applying a watermarking algorithm to said data set consisting of encrypted high order bits, said algorithm resulting in a data set reduced in size;

mapping said reduced data set onto the low order bits of said non-overlapping segment, thereby replacing said low order bits, said reduction in size being sufficient that said mapping results in spare low order bits being left over, some of said spare low order bits being used to indicate watermark attributes, wherein said watermark attributes are the same for all said segments, and wherein spare low order bits containing said watermark attributes are dispersed within said segments in a standardized way so as to be usable as locators;

distributing said watermarked data set;

applying a privacy release algorithm to said watermarked data set; and authenticating said watermarked data set, wherein said authenticating step is performed on a cropped portion of said watermarked data set, said watermark attributes being used to align said over-lapping segments.

6. A method for using watermarks to distribute and authenticate human perceptible source data sets, comprising the steps of:

digitizing and segmenting a human perceptible source data set into a plurality of non-overlapping digitized segments and a corresponding plurality of overlapping digitized segments, wherein each non-overlapping segment is embedded within its corresponding overlapping segment in the same manner, and wherein said digitizing comprises a digital representation of said human perceptible source data set, said digital representation consisting of digital elements, each said element being divided into high order bits and low order bits, said high order bits being sufficient to preserve the human perceptibility of said source data set;

creating a watermarked version of said source data set, wherein said step of creating a watermarked version of said source data set further comprises, for each of said plurality of corresponding segments:

adding privacy control to said high order bits of said overlapping segment, resulting in a data set consisting of encrypted high order bits;

applying a watermarking algorithm to said data set consisting of encrypted high order bits, said algorithm resulting in a data set reduced in size;

mapping said reduced data set onto the low order bits of said non-overlapping segment, thereby replacing said low order bits, said reduction in size being sufficient that said mapping results in spare low order bits being left over some of said spare low order bits being used to indicate watermark attributes;

distributing said watermarked data set;

applying a privacy release algorithm to said watermarked data set; and authenticating said watermarked data set, wherein said authenticating step is performed on a cropped portion of said watermarked data set, and wherein a small fixed synchronization pattern is embedded in said spare low order bits for use in aligning said over-lapping segments.

7. An apparatus for generating a watermark and using said watermark to authenticate a human-perceptible source data set, comprising:

means for extracting higher order bits from said source data set;

means for applying public key cryptography to said higher order bits to generate an encrypted set of bits;

means for generating a watermark from said encrypted set of bits;

means for inserting said watermark into the least significant bits of said source data set, thereby creating a watermarked version of said source data set; and means for authenticating and/or allowing other parties to authenticate that a cropped version of said watermark corresponds to said human-perceptible source data set so that cropped images can be recognized as cropped images and authenticated as cropped images and/or that it can be recognized that blocks within the image have been rearranged.

8. An apparatus for generating a watermark and using said watermark to authenticate a human-perceptible source data set, comprising:

means for extracting higher order bits from said source data set;

means for generating a watermark depending on said higher order bits and, optionally, also depending on additional information;

means for inserting said watermark into the least significant bits of said source data set, thereby creating a watermarked version of said source data set;

means for authenticating and/or allowing other parties to authenticate that said watermark corresponds to said human-perceptible source data set, wherein said authenticating means operates on a cropped version of said watermarked version and cropping is detected by said authenticating means; and means for extracting and/or allowing other parties to extract some or all of said additional information used to create said watermark.

9. An apparatus for generating a watermark and using said watermark to authenticate a human-perceptible source data set, comprising:

means for extracting higher order bits from said source data set;

means for generating a watermark depending on said higher order bits and, optionally, also depending on additional information;

means for inserting said watermark into the least significant bits of said source data set, thereby creating a watermarked version of said source data set;

means for authenticating and/or allowing other parties to authenticate that said watermark corresponds to said human-perceptible source data set, wherein said authenticating means can determine the approximate location of any alteration in said source data set; and means for extracting and/or allowing other parties to extract some or all of said additional information used to create said watermark.

10. An apparatus for using watermarks to distribute and authenticate human perceptible source data sets, comprising:

means for digitizing and segmenting a human perceptible source data set into a plurality of non-overlapping digitized segments and a corresponding plurality of overlapping digitized segments wherein each non-overlapping segment is embedded within its corresponding overlapping segment in the same manner, and wherein said digitizing means comprises a digital representation of said human perceptible source data set, said digital representation consisting of digital elements, each said element being divided into high order bits and low order bits, said high order bits being sufficient to preserve the human perceptibility of said source data set;

means for creating a watermarked version of said source data set, wherein said means for creating a watermarked version of said source data set further comprises, for each of said plurality of corresponding segments:

means for adding privacy control to said high order bits of said overlapping segment, resulting in a data set consisting of encrypted high order bits;

means for applying a watermarking algorithm to said data set consisting of encrypted high order bits, said algorithm resulting in a data set reduced in size; and means for mapping said reduced data set onto the low order bits of said non-overlapping segment thereby replacing said low order bits, said reduction in size being sufficient that said mapping results in spare low order bits being left over, some of said spare low order bits being used to indicate watermark attributes, wherein said watermark attributes are the same for all said segments, and wherein spare low order bits containing said watermark attributes are dispersed within said segments in a standardized way so as to be usable as locators;

means for distributing said watermarked data set;

means for applying a privacy release algorithm to said watermarked data set; and means for authenticating said watermarked data set, wherein said authenticating means operates on a cropped portion of said watermarked data set, said watermark attributes being used to align said overlapping segments.

11. An apparatus for using watermarks to distribute and authenticate human perceptible source data sets, comprising:

means for digitizing and segmenting a human perceptible source data set into a plurality of non-overlapping digitized segments and a corresponding plurality of overlapping digitized segments, wherein each non-overlapping segment is embedded within its corresponding overlapping segment in the same manner, and wherein said digitizing means comprises a digital representation of said human perceptible source data set, said digital representation consisting of digital elements, each said element being divided into high order bits and low order bits, said high order bits being sufficient to preserve the human perceptibility of said source data set;

means for creating a watermarked version of said source data set, wherein said means for creating a watermarked version of said source data set further comprises, for each of said plurality of corresponding segments:

means for adding privacy control to said high order bits of said overlapping segment, resulting in a data set consisting of encrypted high order bits;

means for applying a watermarking algorithm to said data set consisting of encrypted high order bits, said algorithm resulting in a data set reduced in size; and means for mapping said reduced data set onto the low order bits of said non-overlapping segment, thereby replacing said low order bits, said reduction in size being sufficient that said mapping results in spare low order bits being left over, some of said spare low order bits being used to indicate watermark attributes;

means for distributing said watermarked data set;

means for applying a privacy release algorithm to said watermarked data set; and means for authenticating said watermarked data set, wherein said authenticating means operates on a cropped portion of said watermarked data set, and wherein a small fixed synchronization pattern is embedded in said spare low order bits for use in aligning said over-lapping segments.

12. The method of claim 1, wherein said authenticating step can be performed using said watermarked version alone.

* * * * *